(12) United States Patent
Butin

(10) Patent No.: US 9,608,422 B1
(45) Date of Patent: Mar. 28, 2017

(54) ELECTRICAL BOX REPLACEMENT COVER METHOD AND APPARATUS

(71) Applicant: Robert Lee Butin, Mountain Center, CA (US)

(72) Inventor: Robert Lee Butin, Mountain Center, CA (US)

( * ) Notice: Subject to any disclaimer, the term of this patent is extended or adjusted under 35 U.S.C. 154(b) by 0 days.

(21) Appl. No.: 14/445,053

(22) Filed: Jul. 28, 2014

Related U.S. Application Data

(63) Continuation-in-part of application No. 13/858,942, filed on Apr. 8, 2013, now abandoned.

(51) Int. Cl.

| | |
|---|---|
| *H03G 3/14* | (2006.01) |
| *H02G 3/14* | (2006.01) |
| *H02G 3/08* | (2006.01) |
| *B23P 6/00* | (2006.01) |
| *B21J 15/30* | (2006.01) |
| *B21J 15/04* | (2006.01) |

(52) U.S. Cl.
CPC ............ *H02G 3/14* (2013.01); *B23P 6/00* (2013.01); *H02G 3/081* (2013.01); *H02G 3/086* (2013.01); *B21J 15/043* (2013.01); *B21J 15/30* (2013.01); *Y10T 29/49* (2015.01); *Y10T 29/49943* (2015.01); *Y10T 29/49954* (2015.01); *Y10T 29/49956* (2015.01); *Y10T 29/5327* (2015.01); *Y10T 29/53422* (2015.01); *Y10T 29/53774* (2015.01); *Y10T 29/53991* (2015.01)

(58) Field of Classification Search
CPC .......... H02G 3/14; H02G 3/086; H02G 3/081; B23P 6/00; Y10T 29/53991; Y10T 29/49; Y10T 29/53774; Y10T 29/49956; Y10T 29/49943; Y10T 29/5327; Y10T 29/49954; Y10T 29/53422; B21J 15/043; B21J 15/30
See application file for complete search history.

(56) References Cited

U.S. PATENT DOCUMENTS

| | | | |
|---|---|---|---|
| 7,357,148 B1 * | 4/2008 | Gibson | ................... E03C 1/021 137/360 |
| 8,622,364 B2 * | 1/2014 | Bergman | ............ E04H 12/2261 248/523 |

* cited by examiner

*Primary Examiner* — John C Hong
(74) *Attorney, Agent, or Firm* — Neustel Law Offices; Michael S. Neustel

(57) ABSTRACT

The present invention is an electrical box cover system and method of installation that covers and protects existing electrical boxes and their electrical components. This invention prevents corrosion and the resulting damage to the mechanical and electrical components of the electrical box while ensuring the electrical box is safe to open and allowing access to the inside of the electrical box. The electrical box cover system includes a cover, fasteners, and a gasket. Generally, to install the cover, the fasteners are drilled through the cover and onto the sides of the damaged electrical box with the gasket, which is placed in the cover.

20 Claims, 5 Drawing Sheets

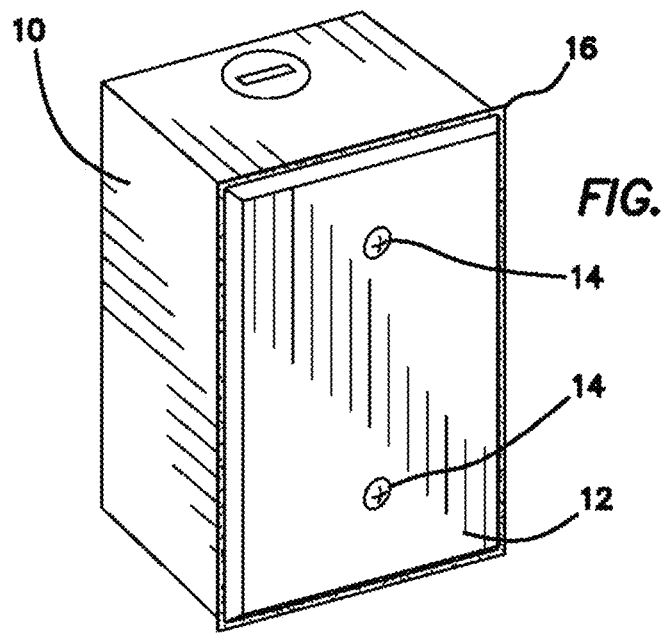
FIG. 1 (PRIOR ART)
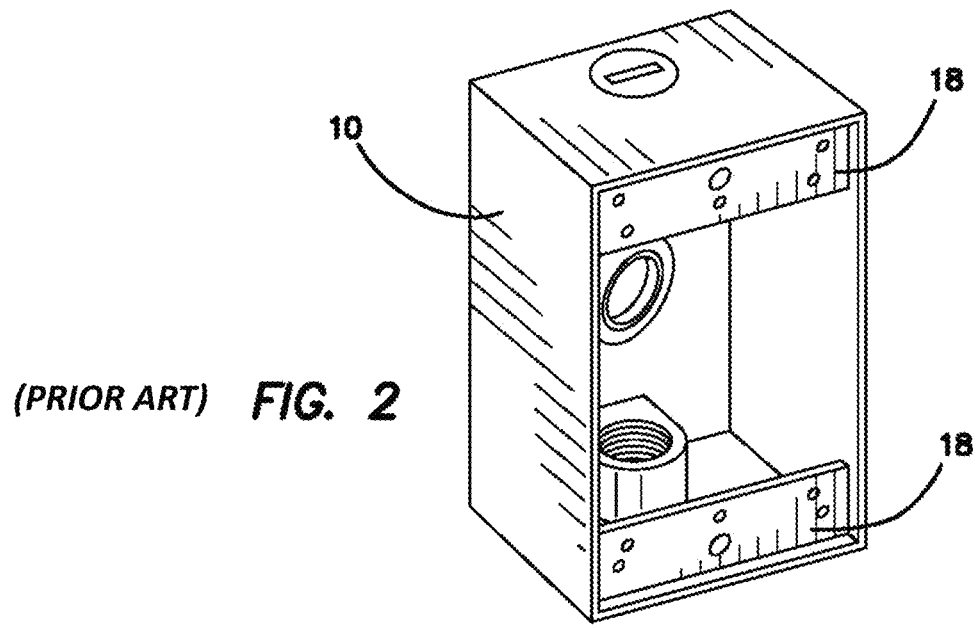
(PRIOR ART) FIG. 2

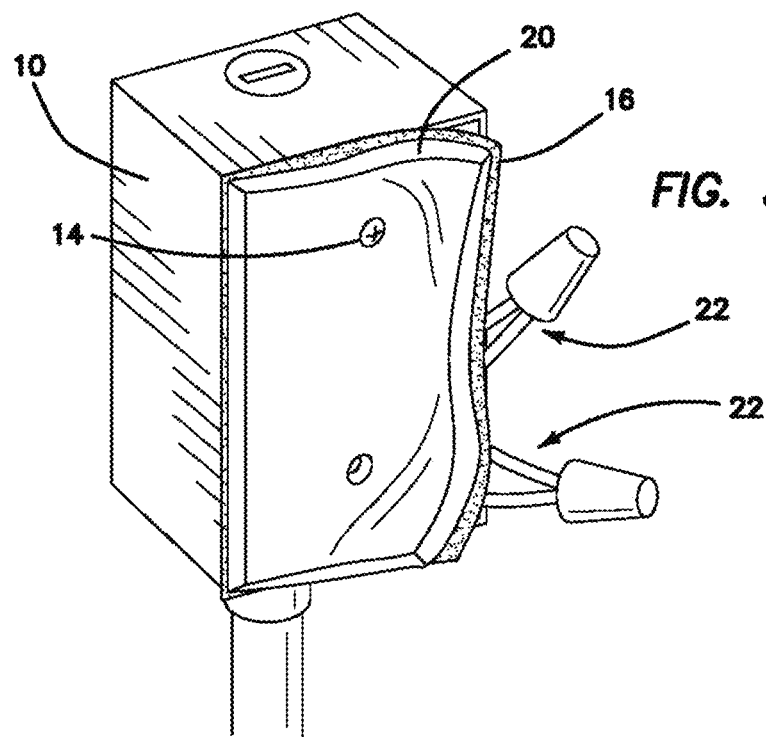
FIG. 3 (PRIOR ART)
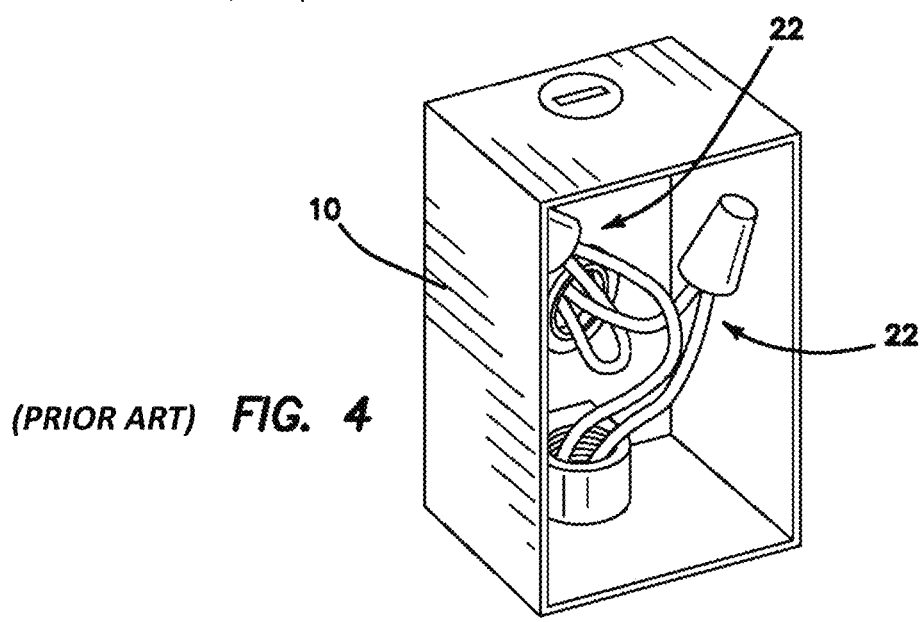
(PRIOR ART) FIG. 4

ELECTRICAL BOX REPLACEMENT COVER METHOD AND APPARATUS

CROSS-REFERENCES TO RELATED APPLICATIONS

The present application is a continuation-in-part from U.S. patent application Ser. No. 13/858,942 filed on Apr. 8, 2013 entitled Electrical Box Replacement Method And Apparatus, which claims priority from U.S. Provisional Application Ser. No. 61/686,857 filed on Apr. 12, 2012 entitled Outdoor Electrical Box Repair Cover. Both previous filings are hereby incorporated herein by reference in their entirety.

TECHNICAL FIELD

The present invention, in some embodiments thereof, relates to devices and methods for covering electrical boxes, and, more particularly, related to devices associated with a watertight methods for attaching such devices to electrical boxes.

BACKGROUND OF THE INVENTION

In the field of outdoor electrical fixture maintenance, protection from environmental elements, particularly rain, landscape sprinklers, bubblers, and water is critical to the function and use of the electrical components. Specifically, this is an issue with outdoor electrical boxes with removable covers, which typically house electrical connections, cords, and receptacles above ground for electricians to easily access. Outdoor electrical wiring is normally required by electrical code to be enclosed in an electrical box. It is often not a viable option to store the electrical box or electrical components underground for protection from the weather. As a result, the structural integrity of the electrical boxes is often compromised by weather and water damage from landscape watering, resulting not only in a damaged or unusable electrical box, but also a risk of electrocution to the electrician or homeowner.

Typically, an electrical box consists of a hollow rectangular prism with at least one side open. Wiring extends from the walls of the electrical box into an interior space, accessible through the open side of the electrical box. To protect and insulate these electrical components from environmental elements, the open side of the electrical box is closed off with a removable flat front plate or cover, secured to the electrical box with screws inserted through the face of the front plate into support structures or threaded internal bosses. A gasket is secured between the front plate and electrical box in attempt to create a watertight seal and protect the electrical components. While the front plate should suitably shield the inside of the electrical box from environmental elements, it must also allow and maintain accessibility to the inside electrical components.

This current system, however, does not adequately protect the inside of the electrical box, putting the electrical components at risk, particularly to water damage and corrosion. As a result of the water damage, the front plate, screws, and internal bosses are subject to corrosion and rust. The front plate can fall off of the electrical box due to corroded threads on the internal bosses, thus allowing the electrical box contents and electrical components to fall out of the electrical box. With enough moisture inside of the electrical box, a small current will flow, resulting in electrolysis and augmenting the corrosion. Furthermore, if the screws are rusted in place, the electrician may be completely prevented from accessing the internal electrical components. Any attempt to remove rusted screws, now rusted in place, will damage the boss strip and render it nonfunctional for new screws.

Once corroded, the threaded holes in the internal boss are no longer usable (due to old screws being rusted in place or stripped screw holes) and a new front plate cannot be installed on the damaged electrical box due. Instead, the entire electrical box must be replaced, a time consuming and costly repair due to the wires running through the electrical box. Currently, a large amount of time and money is devoted to regularly repairing or replacing these electrical boxes. Cheap alternatives to repair the electrical box and damaged cover, such as duct tape or plastic ties, are not weather resistant or safe and are unsightly.

It would therefore be advantageous to have an alternative and effective replacement cover system and complementary installation method that allows a new cover to be installed on current electrical boxes regardless of the degree of corrosion on the internal threads, thereby eliminating the need to completely replace current electrical boxes. It is an object of the present invention to provide and install safe replacement covers that create an effective watertight seal to prevent damage to the inside of the electrical box while maintaining ease of accessibility into the inside of the electrical box, reducing both time and money required for the maintenance and upkeep of electrical boxes.

BRIEF SUMMARY OF EMBODIMENTS OF THE INVENTION

The present invention is directed to a removable and watertight electrical box replacement cover to be attached to existing electrical boxes. Further, the present invention is also directed to a specific method of installation to ensure a safely secured and weather tight environment while maintaining ease of removal.

An aspect of some embodiments of the present invention relates to an electrical box cover system to replace existing electrical box covers. This system utilizes a rectangular replacement cover with unique side panels, fasteners or phillips pan head machine screws, and a gasket. The cover is secured to an electrical box with fasteners or phillips pan head machine screws inserted through the side panels of the cover directly on to the sides of the electrical box. With the gasket, the cover creates a watertight seal with the existing electrical box and is easily installed and removed from the electrical box. The interior dimensions of the cover allow for attachment to a variety of different brands of electrical boxes. This cover can also be made to fit a variety of electrical boxes, including, but not limited to, single gang and double gang boxes. This cover further includes a feature that the side panels draft such that the front area of the cover itself is larger than that of the opening created by the side panels. Thus, when screws are applied and the cover is applied, it makes it virtually impossible for the cover to be unintentionally removed because of how the drafting locks the cover onto the box.

Another embodiment according to the present invention includes an opening in the front of the cover for the placement of electrical components, including, but not limited to receptacles, switches, and connectors and mechanical components, including, but not limited to front opening doors.

Another embodiment according to the present invention includes indentions where the cover and side panels meet.

These indentions may vary in location and number, but help with placement of the cover and stability during installation.

A further embodiment according to the present invention is directed to a cover constructed from plastic, minimizing production costs and weight.

Another embodiment according to the present invention is directed to a cover constructed from poured aluminum to allow for custom dimensions, creating a better fit over the electrical box and further ensuring a watertight environment.

According to a second aspect of the invention there is provided a method for installing the replacement cover onto an existing electrical box to prevent water exposure and the resulting corrosion while allowing ease of installation and accessibility. The method comprises: removing the damaged existing electrical box front plate and damaged threaded internal bosses, moving the internal electrical components away from the electrical make up box side walls, placing the cover, with its drafted side panel and with the gasket over the open end of the electrical make up box. The user exerts firm pressure on the cover and screws in the Phillips Pan Head machine screws through the existing side panel holes on the cover and tightly on to the electrical box's exterior drafted side walls. During this the user may hold the cover by using optional finger hold indentions located at the juncture of the cover and side panel. This method of assembly draws the cover close to the exterior walls of the electrical box. Electrical boxes have a draft, meaning a slight angle to their walls. Similar drafting of the interior of the cover's side panels and the electrical box's drafted walls will interlock the two. The cover locks onto the sides of the damaged electrical box. When screwed on the cover is drawn backwards snuggly onto the box due to the draft. In this way the previously damaged or unusable electrical box is again useable, water-resistant, and the new cover will not come off unintentionally due to the unique drafting features. This eliminates the need to replace the entire electrical box and rewire the unit. This attachment cover method on to the exterior sides of the electrical make up box, is a safe method as there are no issues of any perforation of the sides of the damaged electrical make up box by the screws, to prevent water exposure and the resulting corrosion while allowing ease of the installation and accessibility. Further, this reduces the required time and money to repair corroded electrical boxes. Utilizing this method of assembly can prevent damage to the cover plates and screws, thereby also preventing damage to, and the disposal of the electrical box.

Though it has been stated that phillips pan head machine screws are used, other screws, such as self-drilling screws, are compatible and may be used.

In another optional method the cover can be replaced by removing the damaged existing electrical box front plate and damaged threaded internal bosses, moving the internal electrical components away from the electrical box sidewalls, placing the cover without the gasket over the open side of the electrical box while exerting firm pressure on the cover, driving in self-drilling screws through the existing side panel holes on the cover and into the electrical box, removing the self-drilling screws and cover from the electrical box, placing the gasket within the cover, placing the cover with the gasket over the open end of the electrical box while exerting firm pressure on the cover, and refastening the cover with the gasket onto the electrical box with the screws. This method of assembly draws the cover even closer to the electrical box and thereby creates a complete seal onto a previously damaged or unusable electrical box, which eliminates the need to replace the entire electrical box and rewire the unit. Further, this reduces the required time and money to repair corroded electrical boxes. Utilizing this method of assembly can prevent damage to the cover plates, screws, and boss strips, thereby also preventing damage to, and the disposal of, the electrical box.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 1 is a perspective view of an existing undamaged electrical box;

FIG. 2 is a perspective view of an existing undamaged electrical box with its cover removed;

FIG. 3 is a perspective view of an existing damaged electrical box;

FIG. 4 is a perspective view of an existing electrical box with a damaged cover removed;

Figure 5:
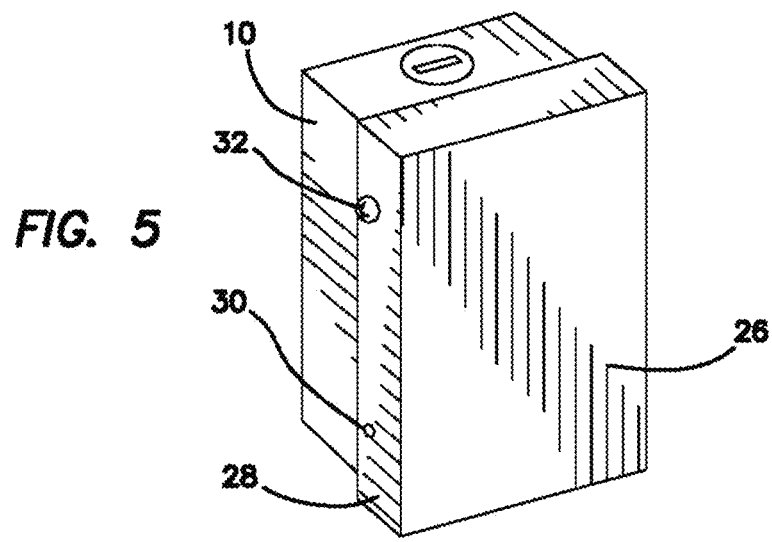
FIG. 5 is a perspective view of a damaged electrical box in intermediate step of a process of repair according to one embodiment of the present invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention, in some embodiments thereof, relates to a novel solution for covering and protecting a previously existing electrical box while maintaining accessibility into the electrical box. Broadly speaking, the present invention includes an electrical box cover system and a method of attaching a replacement cover to an existing electrical box to enclose and protect the contents of the electrical box by ensuring a watertight and weather tight environment while rendering the electrical box safe again and maintaining ease of removal.

Referring now to the Figures and first to FIG. 1, there is shown an undamaged electrical box 10 of the prior art, having an existing covering system that generally includes a front plate 12, a gasket 16, and screws 14. The front plate 12 is typically a flat rectangle, generally sized to fit over electrical box 10. The gasket 16 is typically a generic foam gasket commonly used in electrical appliances, compressed between the front plate 12 and electrical box 10. The undamaged electrical example of FIG. 1 depicts two screws 14 attached directly to the face of the front plate 12. These screws 14 are attached through the front of the front plate 12 into threaded support structures or internal bosses 18, as shown in FIG. 2. The internal bosses 18 are attached to the inside of electrical box 10. FIGS. 1 and 2 depict how the electrical should ideally look in an undamaged state.

Referring now to FIG. 3, there is shown an electrical box 10 and the prior art covering system of FIGS. 1 and 2, warped due to exposure to the elements and the resulting corrosion. FIG. 3, compared to FIGS. 1 and 2, displays the reality of how the current prior art looks and works. The damaged front plate 20 and gasket 16 have warped away from the electrical box 10, allowing internal electrical components 22 to fall out of the electrical box 10 and directly exposing them to the outside. Since the internal bosses 18, as shown previously, and the screws 14 have become corroded, the screws 14 can fall out, augmenting the destruction of the electrical box covering and the damage to the internal electrical components 22.

FIG. 4 shows a typical electrical box 10 with one open side to allow access inside, containing internal electrical components 22 with the damaged front plate 20, gasket 16, screws 14, and internal bosses 18 removed, in preparation for the present invention to be attached to the electrical box 10. Before the electrical box 10 is covered, the internal electrical components 22 must be secured away from the walls of electrical box 10 and the damaged internal bosses must be removed.

Referring now to the present invention in FIG. 5, there is shown an electrical box 10 with a replacement cover 26 in the process of being initially attached to the electrical box 10. The cover 26 (with a gasket) is placed over electrical box 10 as to allow the surrounding side panel 28 of cover 26 to overlap over a portion of the electrical box 10. Fasteners 32, such as phillips pan head machine screws, are screwed through the previously existing side panel holes 30 into the sides of electrical box 10.

In certain embodiments of the present invention, the cover 26 can optionally be constructed out of plastic to minimize cost and weight. Alternatively, the cover 26 can be constructed out of poured aluminum to ensure proper fitting to the electrical box 10. Further, the cover 26 can be made to fit a variety of different brands and sizes of electrical boxes 10, including single gang or double gang electrical boxes.

Figure 6:
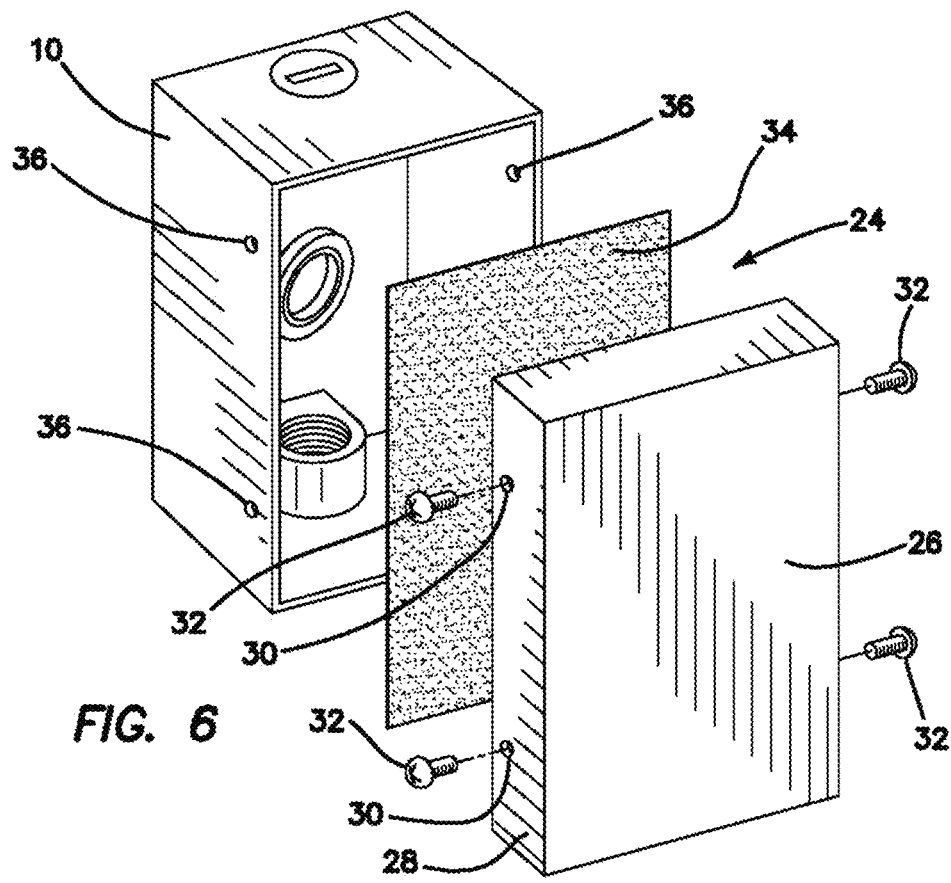
FIG. 6 is an exploded perspective view according to one embodiment of the present invention.

Referring now to FIG. 6, there is shown an exploded view of an electrical box cover system 24 to finally be attached to the previously existing electrical box 10. The electrical box cover system 24 generally comprises a replacement cover 26, a surrounding side panel 28 of the cover 26, fasteners 32 to be inserted into the side panel holes 30, and a gasket 34 to fit inside cover 26.

The gasket 34 is to be positioned within the cover 26 to completely seal off the inside of the electrical box 10. The gasket 34 can be constructed out of weather tight PVC and is preferably flat to fit securely inside the cover 26. Once the gasket 34 is positioned within the cover 26, the cover 26 can be secured to the electrical box 10.

Figure 7:
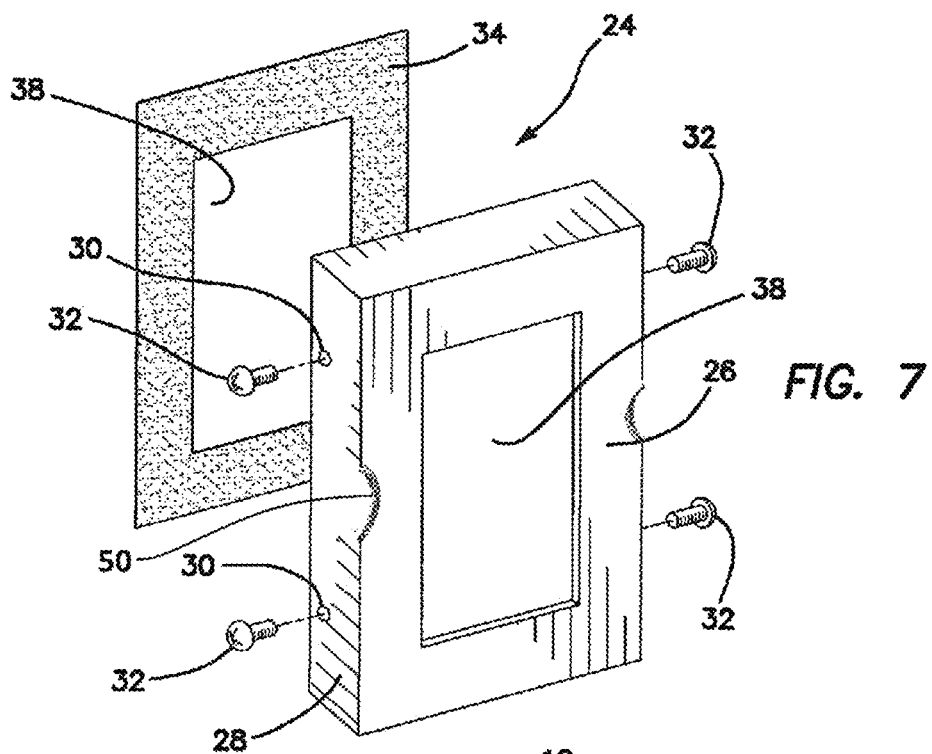
FIG. 7 is an exploded perspective view according to one embodiment of the present invention.

Referring now to FIG. 7, there is shown an exploded unassembled view of an embodiment of the electrical box cover system 24 of the present invention. There is optionally an opening 38 in the cover 26 to allow for receptacles, switches, or other electrical components to be accessed without removing the cover 26. It is understood that opening 38 can be sized or shaped to accommodate a variety of electrical equipment. The opening 38 in FIG. 7 is sized to accommodate a Decora switch or receptacle. Optionally, indentions 50 can be used as finger holds to help in securing the cover during installation. Although these optional features are not included in each representation, they are compatible with all representations of the inventive concept.

Figure 8:
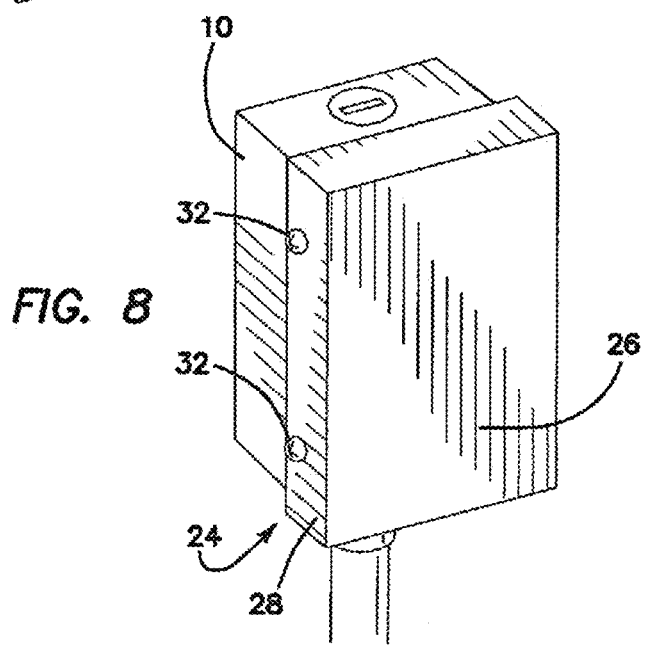
FIG. 8 is a perspective view according to one embodiment of the present invention.

Finally, referring now to FIG. 8, there is shown the electrical box cover system completely attached to the electrical box 10. The fasteners 32 have been inserted through the side panel holes. The gasket 34 is tightly compressed between the cover 26 and electrical box 10.

The installation method of the present invention, on to the electrical box 10 creates a watertight seal and protects the inside of the electrical box, preventing moisture from entering into the box which may cause corrosion and destruction, a common problem with the prior art. Avoiding this corrosion protects the integrity of the mechanical aspects of the electrical box 10 and electrical box cover system 24 as well as the encased internal electrical components 22 while allowing electricians easily access to the inside of the electrical box 10.

Figure 9:
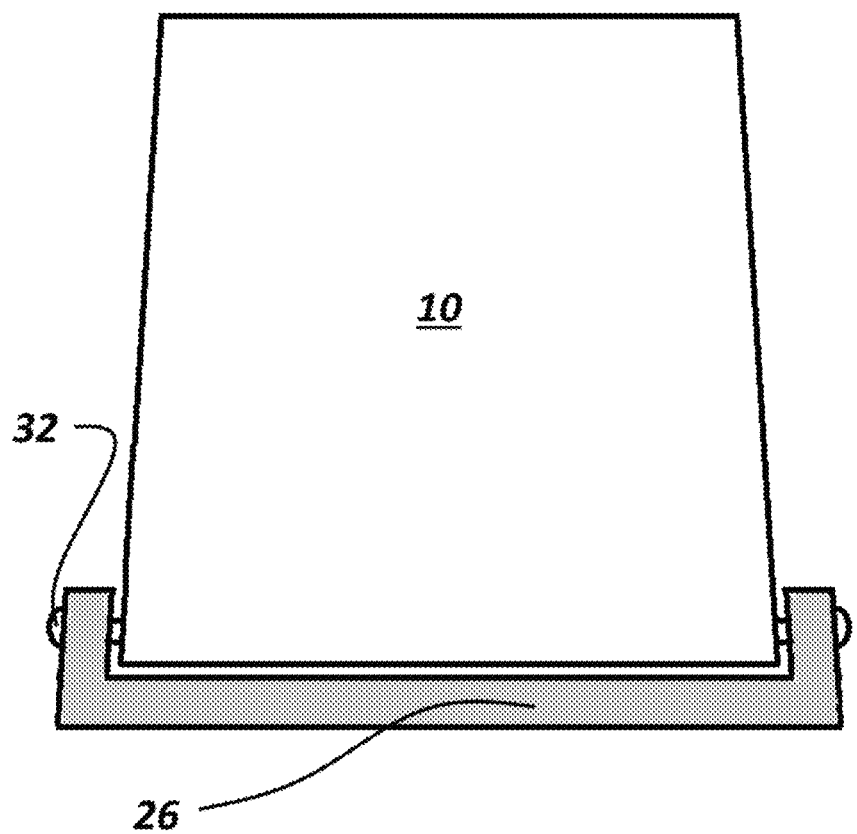
FIG. 9 is a schematic cross-section view according to one embodiment of the present invention, illustrating features important to a variant of the method for repairing an existing electrical box.

FIG. 9 shows the drafting in the electrical box cover system 24 and electrical box 10. Because both electrical box 10 and the surrounding side panel 28 have a wider portion that narrows, this helps to secure the electrical box cover system 24 to the electrical box 10. The screws 32, herein shown in a non-limiting example are phillips pan head machine screws, draw in the edges and creates a secure fit that will not come off due to natural fluctuations in temperature and humidity.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A cover for covering a front opening of an electrical box, comprising:
    a panel having a front surface and a rear surface, wherein the panel has a substantially rectangular shape, wherein the rear surface of the panel has a width and height greater than width and height of the front opening of the electrical box;
    a first side panel extending from a first side of the panel;
    a second side panel extending from a second side of the panel, wherein the second side of the panel is opposite of the first side of the panel, wherein the first side panel and the second side panel both extend rearwardly and inwardly from the panel;
    a first side panel hole extending through the first side panel, wherein the first side panel hole is adapted to receive a first threaded fastener; and
    a second side panel hole extending through the second side panel, wherein the second side panel hole is adapted to receive a second threaded fastener.

2. The cover of claim 1, wherein the panel is comprised of a flat structure.

3. The cover of claim 1, wherein the first side panel and the second side panel mirror one another.

4. The cover of claim 1, wherein the first side panel and the second side panel have approximately the same angle with respect to the rear surface of the panel.

5. The cover of claim 1, wherein the rear surface is substantially parallel with respect to the front surface.

6. The cover of claim 1, wherein the first side panel and the second side panel extend along a substantial portion of the first side and the second side of the panel respectively.

7. The cover of claim 1, wherein the first side panel hole is at a location on the first side panel that substantially corresponds to location of the second side panel hole on the second side panel.

8. The cover of claim 1, wherein a draft angle of the first side panel and the second side panel is substantially equal to a draft angle of the sidewalls of the electrical box.

9. The cover of claim 1, wherein the first side panel and the second side panel are both straight structures that extend rearwardly and inwardly.

10. The cover of claim 1, wherein the first side panel, the second side panel and the panel form an inwardly tapered cavity.

11. The cover of claim 1, including:
   a bottom panel extending from a bottom side of the panel, wherein the bottom panel extends between the first side panel and the second side panel; and
   a top panel extending from a top side of the panel, wherein the top panel extends between the first side panel and the second side panel, wherein the top side of the panel is opposite of the bottom side of the panel, wherein the bottom panel and the top panel both extend rearwardly and inwardly from the panel.

12. The cover of claim 11, wherein the bottom panel, the top panel, the first side panel and the second side panel form a surrounding side panel that extends rearwardly and inwardly from the panel, wherein the surrounding side panel has a rectangular shape.

13. The cover of claim 12, wherein the surrounding side panel defines a rear opening, wherein the rear opening is smaller than the rear surface of the panel.

14. The cover of claim 1, including a gasket adapted to be positioned adjacent the rear surface of the panel between the first side panel and the second side panel.

15. The cover of claim 14, wherein the gasket is constructed of a compressible material.

16. The cover of claim 14, wherein the gasket is comprised of a solid rectangular structure.

17. The cover of claim 14, wherein the gasket is comprised of a rectangular structure with a central opening.

18. A method of attaching the cover of claim 1, comprising:
   positioning a gasket between the rear surface of the panel and a front edge of the electrical box, wherein the front edge surrounds the front opening of the electrical box;
   positioning the cover over a front end of the electrical box with the gasket positioned between the rear surface of the panel and the front edge of the electrical box, wherein the first side panel and the second side panel are adjacent a first side and a second side of the electrical box respectively; and
   threadably inserting the first threaded fastener into the first side panel hole and threadably inserting the second threaded fastener into the second side panel hole so that a distal end of the first threaded fastener engages an outer surface of the first side of the electrical box and a distal end of the second threaded fastener engages an outer surface of the second side of the electrical box.

19. A method of attaching the cover of claim 1, comprising:
   removing a damaged front plate from the electrical box;
   positioning a gasket between the rear surface of the panel and a front edge of the electrical box, wherein the front edge surrounds the front opening of the electrical box;
   positioning the cover over a front end of the electrical box with the gasket positioned between the rear surface of the panel and the front edge of the electrical box, wherein the first side panel and the second side panel are adjacent a first side and a second side of the electrical box respectively; and
   threadably inserting the first threaded fastener into the first side panel hole and threadably inserting the second threaded fastener into the second side panel hole so that a distal end of the first threaded fastener engages an outer surface of the first side of the electrical box and a distal end of the second threaded fastener engages an outer surface of the second side of the electrical box.

20. An electrical box cover system, comprising:
   an electrical box having a front opening, a first side, a second side, a bottom side and a top side, wherein the front opening is rectangular shaped and defined by a front edge, and wherein the first side and the second side of the electrical box extend rearwardly and inwardly from the front edge of the electrical box;
   a gasket positioned adjacent the front edge of the electrical box, wherein the gasket has a rectangular shape corresponding to the shape of the front edge of the electrical box; and
   a cover enclosing the front opening of the electrical box with the gasket positioned between the cover and the front edge of the electrical box, said cover comprising:
   a panel having a front surface and a rear surface, wherein the panel has a substantially rectangular shape, wherein the rear surface of the panel has a width and height greater than width and height of the front opening of the electrical box;
   a first side panel extending from a first side of the panel;
   a second side panel extending from a second side of the panel, wherein the second side of the panel is opposite of the first side of the panel, wherein the first side panel and the second side panel both extend rearwardly and inwardly from the panel, wherein the first side panel and the second side panel have approximately the same angle with respect to the rear surface of the panel, wherein a draft angle of the first side panel and the second side panel is substantially equal to a draft angle of the first side and the second side of the electrical box;
   a bottom panel extending from a bottom side of the panel, wherein the bottom panel extends between the first side panel and the second side panel;
   a top panel extending from a top side of the panel, wherein the top panel extends between the first side panel and the second side panel, wherein the top side of the panel is opposite of the bottom side of the panel, wherein the bottom panel and the top panel both extend rearwardly and inwardly from the panel, wherein the bottom panel, the top panel, the first side panel and the second side panel form a surrounding side panel that extends rearwardly and inwardly from the panel, wherein the surrounding side panel has a rectangular shape, wherein the surrounding side panel defines a rear opening, wherein the rear opening is smaller than the rear surface of the panel;
   a first side panel hole extending through the first side panel;
   a second side panel hole extending through the second side panel;
   a first threaded fastener threadably connected through the first side panel hole with a distal end of the first threaded fastener engaging the first side of the electrical box; and
   a second threaded fastener threadably connected through the second side panel hole with a distal end of the second threaded fastener engaging the second side of the electrical box.

* * * * *